United States Patent
Tsai et al.

(10) Patent No.: US 11,145,958 B2
(45) Date of Patent: *Oct. 12, 2021

(54) MOBILE DEVICE AND MANUFACTURING METHOD THEREOF

(71) Applicant: HTC Corporation, Taoyuan (TW)

(72) Inventors: Tiao-Hsing Tsai, Taoyuan (TW);
Chien-Pin Chiu, Taoyuan (TW);
Hsiao-Wei Wu, Taoyuan (TW);
Shen-Fu Tzeng, Taoyuan (TW);
Yi-Hsiang Kung, Taoyuan (TW);
Li-Yuan Fang, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/895,028

(22) Filed: Jun. 8, 2020

(65) Prior Publication Data

US 2020/0303810 A1 Sep. 24, 2020

Related U.S. Application Data

(63) Continuation of application No. 15/723,336, filed on Oct. 3, 2017, now Pat. No. 10,727,569.

(Continued)

(51) Int. Cl.
*H01Q 1/24* (2006.01)
*H01Q 1/38* (2006.01)
(Continued)

(52) U.S. Cl.
CPC .............. *H01Q 1/243* (2013.01); *H01Q 1/38* (2013.01); *H01Q 1/48* (2013.01); *H01Q 5/35* (2015.01);
(Continued)

(58) Field of Classification Search
CPC ........ H01Q 1/243; H01Q 7/005; H01Q 5/364; H01Q 1/48; H01Q 9/0421; H01Q 1/38;
(Continued)

(56) References Cited

U.S. PATENT DOCUMENTS 9,059,505 B1 * 6/2015 Asrani .................... H01Q 1/243
2003/0112195 A1 6/2003 Cheng et al.
(Continued)

FOREIGN PATENT DOCUMENTS

CN 201533015 U 7/2010
CN 102570027 A 7/2012
(Continued)

OTHER PUBLICATIONS

Chinese Office Action and Search Report, dated Aug. 14, 2020, for Chinese Application No. 201710951672.4.

*Primary Examiner* — Andrea Lindgren Baltzell
*Assistant Examiner* — Michael M Bouizza
(74) *Attorney, Agent, or Firm* — Birch, Stewart, Kolasch & Birch, LLP

(57) ABSTRACT

A mobile device at least includes a first circuit board, a metal frame, an electronic component, a second circuit board, and an RF (Radio Frequency) module. The first circuit board includes a system ground plane. The metal frame at least includes a first portion. The first portion is electrically coupled to the system ground plane and a feeding point. An antenna structure is formed by the first portion and the feeding point. The second circuit board is electrically coupled to the electronic component. The electronic component and the second circuit board are adjacent to the first portion of the metal frame. The RF module is electrically coupled to the feeding point, so as to excite the antenna structure.

25 Claims, 11 Drawing Sheets

Related U.S. Application Data

(60) Provisional application No. 62/437,226, filed on Dec. 21, 2016.

(51) Int. Cl.
    *H01Q 1/48*         (2006.01)
    *H01Q 5/35*         (2015.01)
    *H01Q 5/364*       (2015.01)
    *H01Q 7/00*         (2006.01)
    *H01Q 9/04*         (2006.01)
    *H04B 1/3827*      (2015.01)
    *H04M 1/02*        (2006.01)

(52) U.S. Cl.
    CPC ............. *H01Q 5/364* (2015.01); *H01Q 7/005* (2013.01); *H01Q 9/0421* (2013.01); *H04B 1/3827* (2013.01); *H04M 1/0277* (2013.01); *H04M 1/0283* (2013.01)

(58) Field of Classification Search
    CPC .. H01Q 5/35; H01Q 5/10; H01Q 5/20; H01Q 1/22; H01Q 1/36; H01Q 1/44; H01Q 1/50; H04M 1/0277; H04M 1/0283; H04B 1/3827
    See application file for complete search history.

(56) References Cited

U.S. PATENT DOCUMENTS

| | | | |
|---|---|---|---|
| 2013/0207855 A1* | 8/2013 | Chien | .................. H01Q 13/10 343/721 |
| 2015/0244063 A1* | 8/2015 | Sowpati | ................... H01Q 1/44 343/702 |
| 2017/0012341 A1 | 1/2017 | Mai et al. | |
| 2017/0155186 A1 | 6/2017 | Lin | |
| 2017/0207516 A1 | 7/2017 | Koo et al. | |
| 2017/0250460 A1 | 8/2017 | Shin et al. | |

FOREIGN PATENT DOCUMENTS

| | | |
|---|---|---|
| CN | 103236583 A | 8/2013 |
| CN | 203398262 U | 1/2014 |
| CN | 204289710 U | 4/2015 |
| CN | 105206918 A | 12/2015 |
| CN | 105428786 A | 3/2016 |
| CN | 105591190 A | 5/2016 |
| CN | 103219582 B | 8/2016 |
| CN | 105846050 A | 8/2016 |
| CN | 106816706 A | 6/2017 |

\* cited by examiner

MOBILE DEVICE AND MANUFACTURING METHOD THEREOF

CROSS REFERENCE TO RELATED APPLICATIONS

This application is a Continuation of copending application Ser. No. 15/723,336, filed on Oct. 3, 2017, which claims priority under 35 U.S.C. § 119(e) to U.S. Provisional Application No. 62/437,226, filed on Dec. 21, 2016, all of which are hereby expressly incorporated by reference into the present application.

BACKGROUND OF THE INVENTION

Field of the Invention

The disclosure generally relates to a mobile device, and more particularly, to a mobile device and an antenna structure therein.

Description of the Related Art

With the advancements being made in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi and Bluetooth systems and using frequency bands of 2.4 GHz and 5 GHz.

In order to improve their appearance, current designers often incorporate metal elements into mobile devices. However, the newly added metal elements tend to negatively affect the antennas that provide wireless communication in mobile devices, thereby degrading the overall communication quality of the mobile devices. As a result, there is a need to propose a novel mobile device with a novel antenna structure, so as to overcome the problems of the prior art.

BRIEF SUMMARY OF THE INVENTION

In a preferred embodiment, the invention is directed to a mobile device including a first circuit board, a metal frame, an extension radiation element, an electronic component, a second circuit board, and an RF (Radio Frequency) module. The first circuit board includes a system ground plane. The metal frame includes a first portion. The first portion is coupled to the system ground plane. A clearance region is formed between the first portion and the system ground plane. The first portion and the extension radiation element are coupled to a feeding point. An antenna structure is formed by the first portion and the extension radiation element. The second circuit board is coupled to the electronic component. The electronic component and the second circuit board are adjacent to the first portion. The RF module is coupled to the feeding point, so as to excite the antenna structure.

In some embodiments, the first portion has a first end and a second end. A first end of the first portion is coupled to a first shorting point on the system ground plane. A second end of the first portion is coupled to a second shorting point on the system ground plane.

In some embodiments, the clearance region is positioned between the first shorting point and the second shorting point.

In some embodiments, the metal frame further includes a second portion, and the extension radiation element is formed by the second portion.

In some embodiments, the first portion substantially has a straight-line shape.

In some embodiments, the extension radiation element substantially has an L-shape.

In some embodiments, the extension radiation element has a vertical projection which at least partially overlaps the second circuit board.

In some embodiments, the extension radiation element has a vertical projection which at least partially overlaps the clearance region.

In some embodiments, the clearance region substantially has a narrow and long rectangular shape.

In some embodiments, the mobile device further includes a feeding connection element coupled between the RF module and the feeding point.

In some embodiments, the second circuit board is further coupled to the system ground plane.

In some embodiments, the antenna structure covers a low-frequency band from 2400 MHz to 2500 MHz, and a high-frequency band from 5150 MHz to 5875 MHz.

In some embodiments, the first portion is excited to generate the low-frequency band, and the extension radiation element is excited to generate the high-frequency band.

In some embodiments, the length of the first portion is equal to 0.5 wavelength of the low-frequency band.

In some embodiments, the length of the extension radiation element is equal to 0.25 wavelength of the high-frequency band.

In some embodiments, the electronic component includes a power button and/or a volume button.

In some embodiments, the power button and the volume button are disposed at an external side of the first portion.

In some embodiments, the electronic component includes one or more sensing elements.

In some embodiments, the sensing elements are disposed at an internal side of the first portion.

In some embodiments, the first circuit board is a system circuit board, and the second circuit board is a flexible printed circuit board.

In a preferred embodiment, the invention is directed to a method for manufacturing a mobile device. The method includes the steps of: providing a first circuit board, a metal frame, an extension radiation element, an electronic component, a second circuit board, and an RF (Radio Frequency) module, wherein the first circuit board includes a system ground plane, the metal frame includes a first portion, and the electronic component and the second circuit board are adjacent to the first portion; coupling the first portion to the system ground plane; forming a clearance region between the first portion and the system ground plane; coupling the first portion and the extension radiation element to a feeding point, such that an antenna structure is formed by the first portion and the extension radiation element; coupling the second circuit board to the electronic component; and coupling the RF module to the feeding point, so as to excite the antenna structure.

In another preferred embodiment, the invention is directed to a mobile device including a first circuit board, a metal frame, an electronic component, a second circuit board, and an RF (Radio Frequency) module. The first circuit board includes a system ground plane. The metal frame at least includes a first portion. The first portion is electrically coupled to the system ground plane and a feeding point. A clearance region is formed between the first portion and the system ground plane. An antenna structure is formed by the first portion and the feeding point. The second circuit board is electrically coupled to the electronic component. The electronic component and the flexible printed circuit board are adjacent to the first portion. The RF module is electrically coupled to the feeding point, so as to excite the antenna structure.

In another preferred embodiment, the invention is directed to a method for manufacturing a mobile device. The method includes the steps of: providing a system circuit board, a metal frame, an extension radiation element, an electronic component, a flexible printed circuit board, and an RF (Radio Frequency) module, wherein the system circuit board includes a system ground plane, the metal frame includes a first portion, and the electronic component and the flexible printed circuit board are adjacent to the first portion; electrically coupling the first portion to the system ground plane; forming a clearance region between the first portion and the system ground plane; coupling the flexible printed circuit board to the electronic component; and electrically coupling the first portion and the extension radiation element to a feeding point, and coupling the RF module to the feeding point, such that the first portion and the extension radiation element operate in a plurality of frequency bands.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1A:
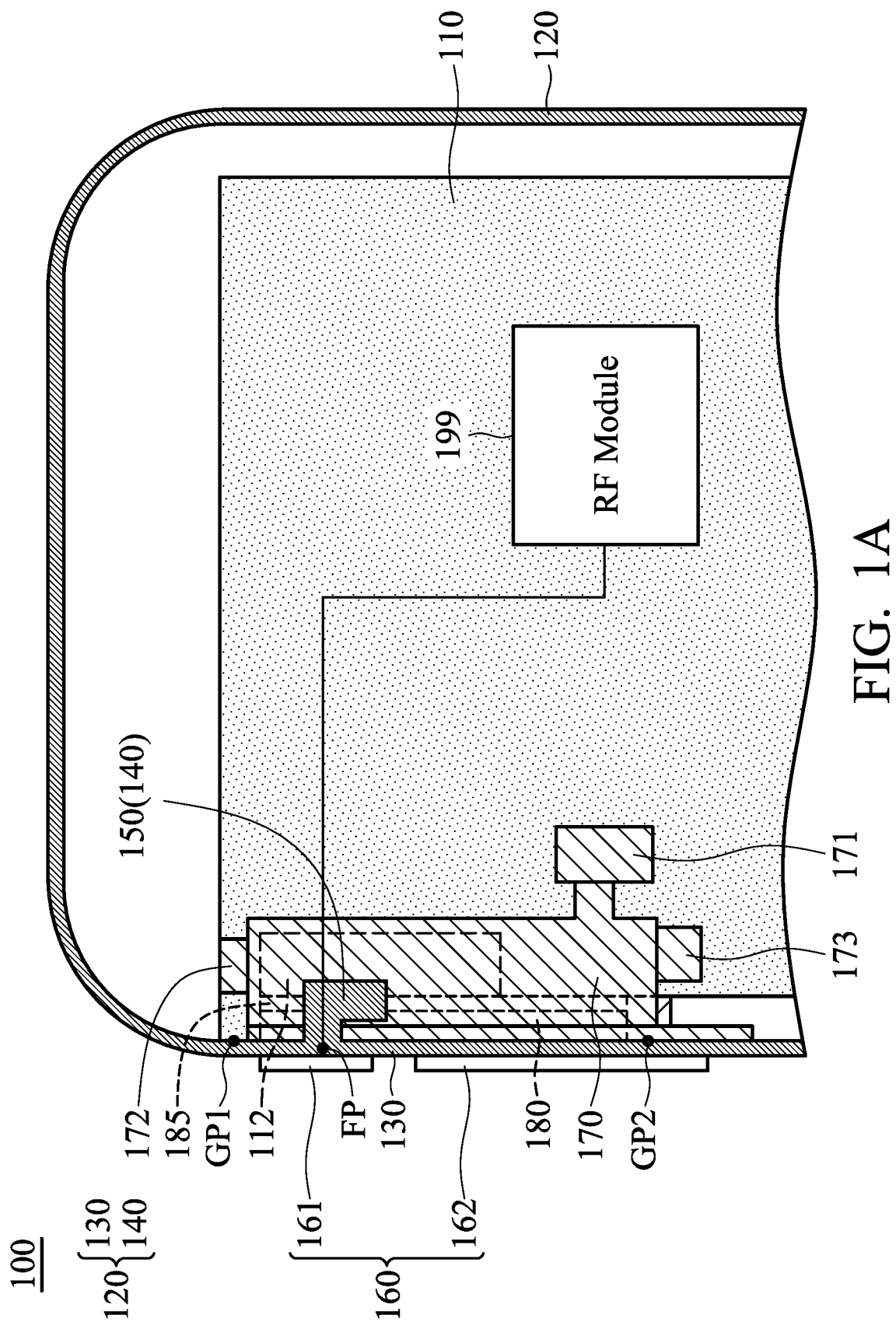
FIG. 1A is a back view of a mobile device according to an embodiment of the invention.
Figure 1B:
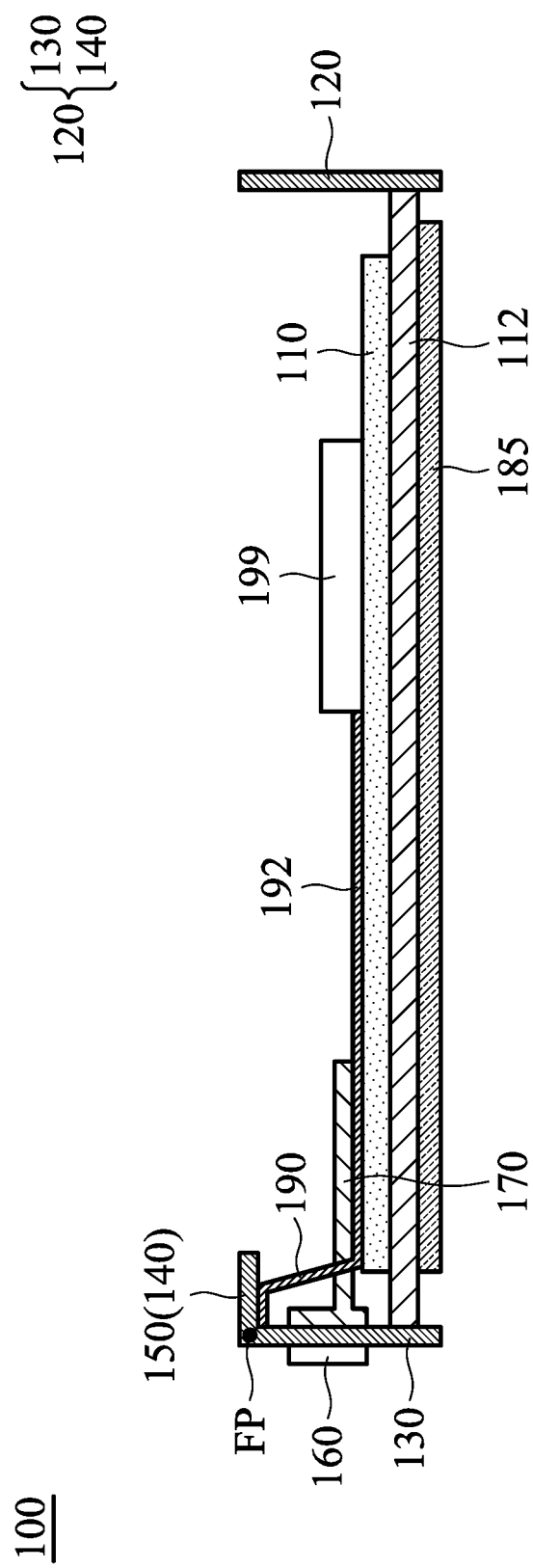
FIG. 1B is a side view of a mobile device according to an embodiment of the invention.
Figure 2:
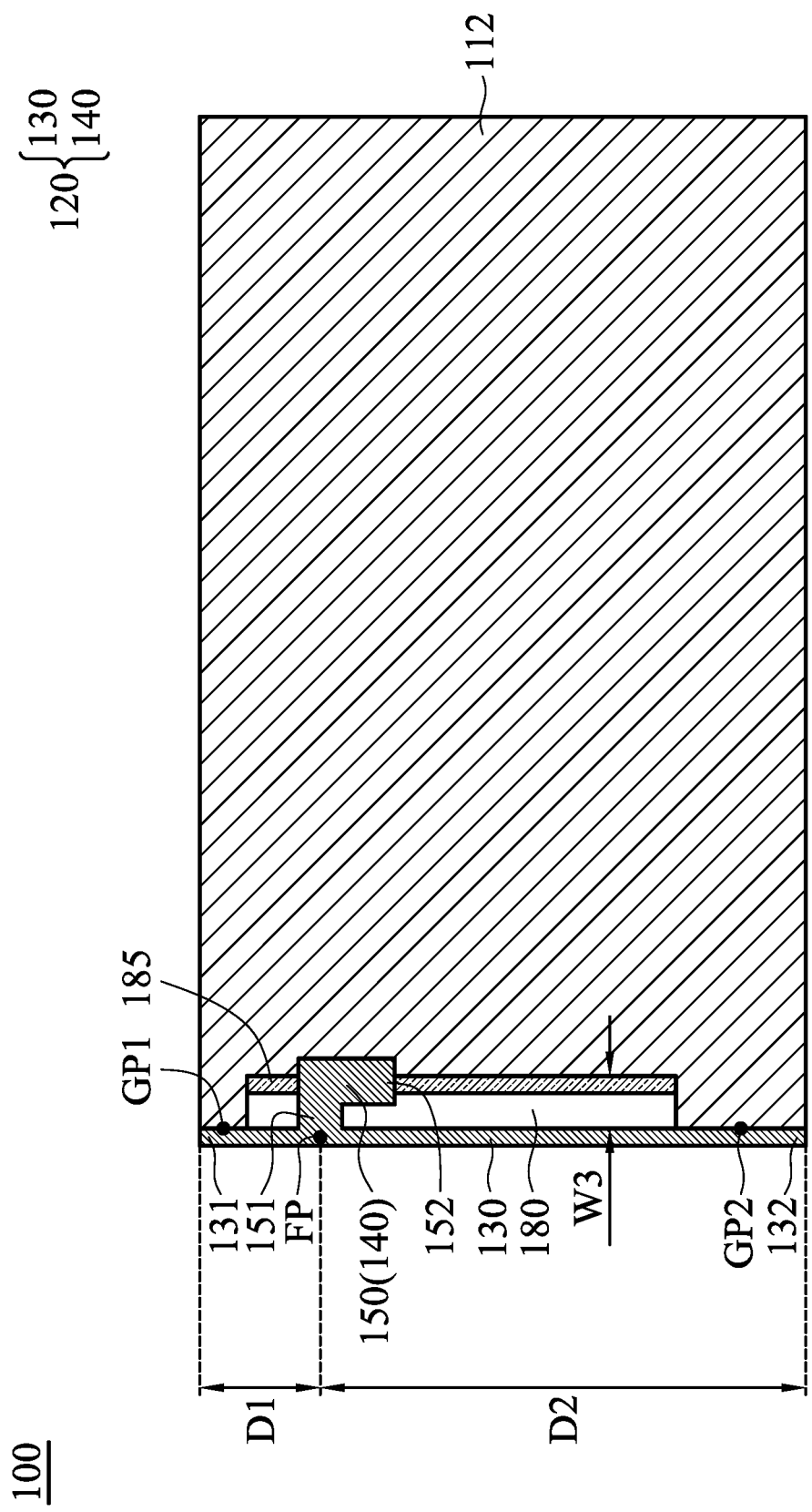
FIG. 2 is a back view of an antenna structure of a mobile device according to an embodiment of the invention.

FIG. 1A is a back view of a mobile device 100 according to an embodiment of the invention. FIG. 1B is a side view of the mobile device 100 according to an embodiment of the invention. FIG. 2 is a back view of an antenna structure of the mobile device 100 according to an embodiment of the invention (except for the antenna structure, the other elements are temporarily hidden). Please refer to FIG. 1A, FIG. 1B, and FIG. 2 together. The mobile device 100 may be a smart phone, a tablet computer, or a notebook computer. In the embodiment of FIG. 1A and FIG. 1B, the mobile device 100 at least includes a system circuit board 110 (or called "first circuit board"), a metal frame 120, an extension radiation element 150, an electronic component 160, an FPC (Flexible Printed Circuit Board) 170 (or called "second circuit board"), and an RF (Radio Frequency) module 199. It should be understood that the mobile device 100 may further include other components, such as a processor, s speaker, a touch control module, a power supply module, and a housing although they are not displayed in FIG. 1A and FIG. 1B.

The system circuit board 110 includes a system ground plane 112, which is made of a metal material. The system ground plane 112 is configured to provide a ground voltage. The shapes and sizes of the system circuit board 110 and the system ground plane 112 are not limited in the invention, and they may be adjusted to meet different requirements. The metal frame 120 may be an appearance element of the mobile device 100. The metal frame 120 at least includes a first portion 130. The first portion 130 may substantially have a straight-line shape. Specifically, the first portion 130 has a first end 131 and a second end 132. The first end 131 of the first portion 130 is coupled to a first shorting point GP1 on the system ground plane 112. The second end 132 of the first portion 130 is coupled to a second shorting point GP2 on the system ground plane 112. A clearance region 180 is formed between the first portion 130 of the metal frame 120 and the system ground plane 112. In alternative embodiments, if the mobile device 100 further includes a display device 185, the clearance region 180 will be defined between the first portion 130 of the metal frame 120 and the display device 185. The clearance region 180 may substantially have a narrow and long rectangular shape, and it may be positioned between the first shorting point GP1 and the second shorting point GP2. The length of the clearance region 180 is equal to or slightly shorter than the length of the first portion 130. The first portion 130 of the metal frame 120 is coupled to a feeding point FP. The feeding point FP is positioned between the first end 131 and the second end 132 of the first portion 130. The feeding point FP is closer to the first shorting point GP1 than the second shorting point GP2.

The extension radiation element 150 is made of a metal material. In some embodiments, the metal frame 120 further includes a second portion 140, and the extension radiation element 150 is formed by the second portion 140. That is, the extension radiation element 150 and the metal frame 120 may be integrally formed. In alternative embodiments, the metal frame 120 does not include the second portion 140, and the extension radiation element 150 is printed on another FPC or is formed on a plastic supporting element using an LDS (Laser Direct Structuring) technique. The extension radiation element 150 may substantially have an L-shape. In alternative embodiments, the extension radiation element 150 has a different shape, so as to meet the requirement of difference frequencies. Specifically, the extension radiation element 150 has a first end 151 and a second end 152. The first end 151 of the extension radiation element 150 is coupled to the feeding point FP. The second end 152 of the extension radiation element 150 is an open end, which extends away from the first grounding point GP1. A portion of the extension radiation element 150 is parallel to the first portion 130 of the metal frame 120, and another portion of the extension radiation element 150 is perpendicular to the first portion 130 of the metal frame 120. The extension radiation element 150 may have a vertical projection which at least partially overlaps the clearance region 180. In addition, the extension radiation element 150 may have a vertical projection which at least partially overlaps the system ground plane 112. An antenna structure is formed by the first portion 130 of the metal frame 130 and the extension radiation element 150. In alternative embodiments, the metal frame 130 of the mobile device 100 includes only the first portion 130 without the second portion 140 (i.e., adjustments are made such that the antenna structure does not include the extension radiation element 150), but it can still have a similar level of performance to that of the original antenna structure (including both the first portion 130 and the second portion 140 or the extension radiation element 150). The RF module 199 may be disposed on the system circuit board 110. The RF module 199 is coupled to the feeding point FP, so as to excite the aforementioned antenna structure. In some embodiments, the mobile device 100 further includes a feeding connection element 190 and an RF signal line 192. The feeding point FP is coupled through the feeding connection element 190 and the RF signal line 192 to the RF module 199. For example, the feeding connection element 190 may be a 3D (Three-Dimensional) connection structure, which may be implemented with a pogo pin, a metal spring, or a metal screw. The first portion 130 and the second portion 140 of the metal frame 120 may be both disposed at a side of the mobile device 100. The other portions of the metal frame 120 may be selectively distributed over the top, the bottom, and/or another side of the mobile device 100. Accordingly, the whole metal frame 120 may substantially have a loop shape, and the system circuit board 110 may be disposed in a hollow interior of the metal frame 120.

In the embodiment of FIG. 1A and FIG. 1B, the electronic component 160 at least includes a power button 161 and/or a volume button 162, but the invention is not limited thereto. In other embodiments, the electronic component 160 includes fewer or more physical buttons and/or sockets with different functions. The FPC 170 is coupled to the power button 161 and the volume button 162 of the electronic component 160. The electronic component 160 and the FPC 170 are both adjacent to the first portion 130 of the metal frame 120. For example, the power button 161 and the volume button 162 may be at least partially disposed at an external side of the first portion 130 of the metal frame 120 (alternatively, the power button 161 and the volume button 162 may partially extend to an internal side of the first portion 130 of the metal frame 120), and the FPC 170 may be disposed at the internal side of the first portion 130 of the metal frame 120. The first portion 130 of the metal frame 120 may have one or more openings thereon although they are not displayed in FIG. 1A and FIG. 1B. Accordingly, the electronic component 160 may be coupled through the aforementioned openings to the FPC 170. The FPC 170 may be further configured to carry some traces and circuit layouts of control elements.

The extension radiation element 150 has a vertical projection which at least partially overlaps the FPC 170. For example, the whole vertical projection of the extension radiation element 150 may be inside the FPC 170. In some embodiments, the FPC 170 is further coupled to the system ground plane 112. For example, the FPC 170 may further include an FPC connector 171 and two bare copper regions 172 and 173. The FPC connector 171 and the bare copper regions 172 and 173 may penetrate through the system circuit board 110. The FPC connector 171 and the bare copper regions 172 and 173 may be coupled to the system ground plane 112. Specifically, the bare copper region 172 may be adjacent to the first grounding point GP1 or may overlap the first grounding point GP1; the bare copper region 173 may be adjacent to the second grounding point GP2 or may overlap the second grounding point GP2. With such a design, the electronic component 160 and the FPC 170 can be integrated with the aforementioned antenna structure, and they are considered as an extension portion of the antenna structure. Accordingly, the electronic component 160 and the FPC 170 do not interfere with the radiation performance of the antenna structure so much.

In alternative embodiments, a metal layer (or a conductive material layer) of the FPC 170 substantially has a C-shape or an L-shape. The metal layer of the FPC 170 may extend along an outer edge of the clearance region 180, and the vertical projection of the metal layer may at least partially overlap the clearance region 180.

In some embodiments, the mobile device 100 further includes one or more other antenna elements (not shown). The other antenna elements may be formed by the other portions of the metal frame 120, and they may be positioned at the top or the bottom of the mobile device 100. The other antenna elements may further have one or more cut points. The other antenna elements may be used as main antennas of the mobile device 100. On the other hand, because the clearance region 180 is relatively small, the aforementioned antenna structure may be used as an auxiliary antenna of the mobile device 100, so as to increase the antenna diversity gain of the mobile device 100. For example, the first shorting point GP1 can be positioned between the antenna structure and the other antenna elements, so as to enhance the isolation between the other antenna elements and the antenna structure.

Figure 3:
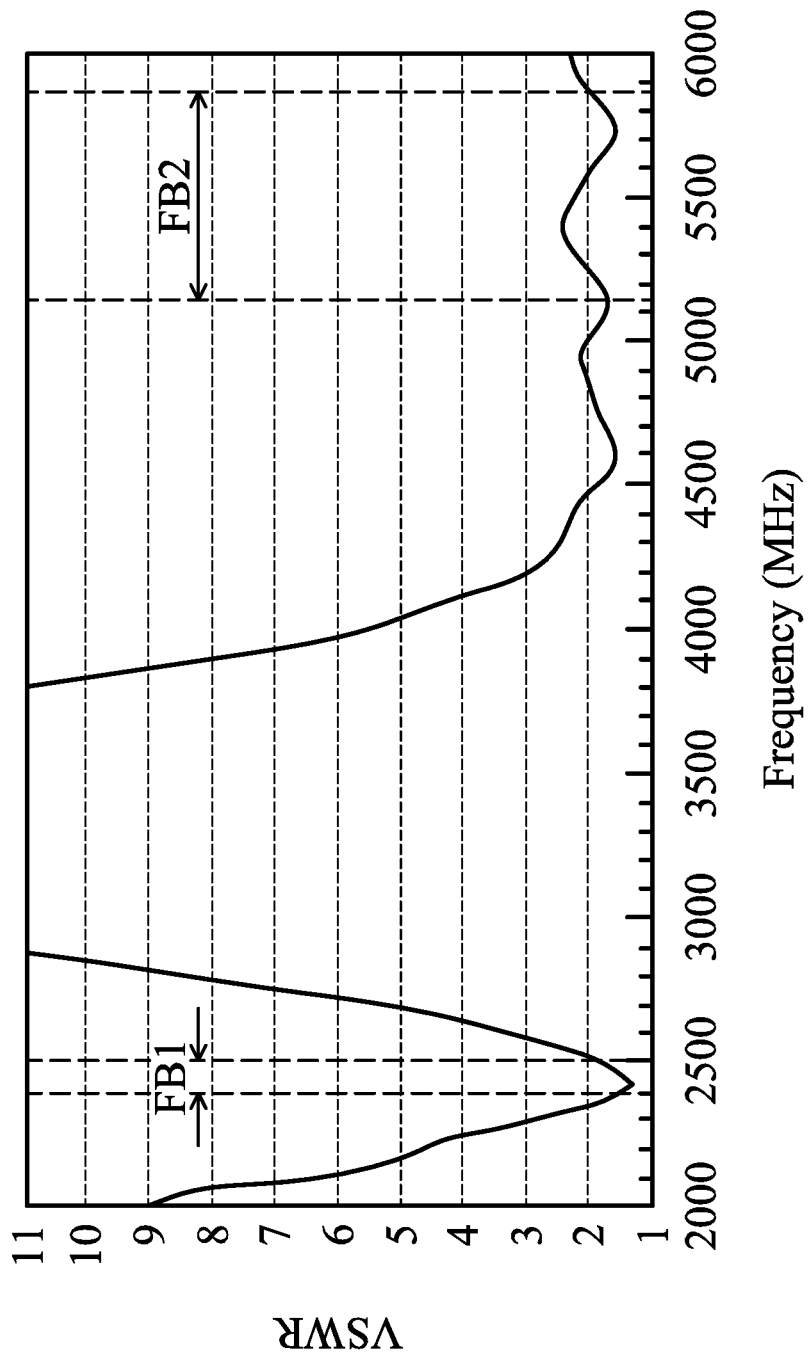
FIG. 3 is a diagram of VSWR (Voltage Standing Wave Ratio) of an antenna structure of a mobile device according to an embodiment of the invention.

FIG. 3 is a diagram of VSWR (Voltage Standing Wave Ratio) of the antenna structure of the mobile device 100 according to an embodiment of the invention. The horizontal axis represents the operation frequency (MHz), and the vertical axis represents the VSWR. According to the measurement in FIG. 3, the antenna structure of the mobile device 100 can cover a low-frequency band FB1 from 2400 MHz to 2500 MHz, and a high-frequency band FB2 from 5150 MHz to 5875 MHz. Therefore, the mobile device 100 can support at least the dual-band operations of WLAN (Wireless Local Area Networks) 2.4 GHz/5 GHz (or Wi-Fi). The above frequency ranges may be adjusted to meet different requirements.

The antenna theory and the element sizes of the mobile device 100 may be as follows. The first portion 130 of the metal frame 120 is excited to generate the low-frequency band FB1, and the extension radiation element 150 (or the second portion 140 of the metal frame 120) is excited to generate the high-frequency band FB2. The length of the first portion 130 (i.e., the length from the first end 131 to the second end 132, or the length from the first shorting point GP1 to the second shorting point GP2) may be substantially equal to 0.5 wavelength ($\lambda/2$) of the low-frequency band FB1. The length of the extension radiation element 150 (i.e., the length from the first end 151 to the second end 152, or the length from the feeding point FP to the second end 152) may be substantially equal to 0.25 wavelength ($\lambda/4$) of the high-frequency band FB2. A first distance D1 is defined between the feeding point FP and the first end 131 of the first portion 130 (or the first shorting point GP1). A second distance D2 is defined between the feeding point FP and the second end 132 of the first portion 130 (or the second shorting point GP2). The ratio of the second distance D2 to the first distance D1 (D2/D1) may be substantially from 4 to 5. For example, the first distance D1 may be about 8.5 mm, and the second distance D2 may be about 35.5 mm, but they are not limited thereto. The width W3 of the clearance region 180 (i.e., the shortest distance between the first portion 130 of the metal frame 120 and the system ground plane 112 or the display device 185, wherein the distance between the system ground plane 112 and the metal frame 120 may be longer than or equal to the distance between the display device 185 and the metal frame 120) may be arranged for adjusting the impedance matching and the bandwidth of the aforementioned antenna structure. If the width W3 of the clearance region 180 becomes larger, the bandwidth of the low-frequency band FB1 of the antenna structure will become wider; conversely, if the width W3 of the clearance region 180 becomes smaller, the bandwidth of the low-frequency band FB1 of the antenna structure will become narrower. For example, the width W3 may be about 1.5 mm, but it is not limited thereto. Furthermore, the impedance matching of the low-frequency band FB1 is further fine-tuned by changing the position of the feeding point FP. The above element sizes are calculated and obtained according to many experiment results, and they help to optimize the operation performance of the antenna structure of the mobile device 100. According to the practical measurement, the radiation efficiency of the antenna structure of the mobile device 100 is higher than 13.6% in both the low-frequency band FB1 and the high-frequency band FB2. This can meet the requirements of application of general mobile communication devices.

In the mobile device 100 of the invention, since the metal frame 120 is used as a main radiator of the antenna structure, it can effectively prevent the metal frame 120 from negatively affecting the communication quality of the antenna structure. Furthermore, the antenna structure can be integrated with the electronic component 160 (e.g., side buttons and/or sockets) and the FPC 170, and used together with the narrow and small clearance region 180, so as to minimize the whole antenna size (a conventional mobile device usually has too small a clearance region at its side to accommodate any antenna structure). In addition, there is no cut point on at least the first portion 130 of the metal frame 120. Such a design can significantly improve the robustness and the produce appearance of the mobile device 100. The invention can support the communication technology including, for example, Wi-Fi and MIMO (Multi-Input and Multi-Output), and therefore it is suitable for application in a variety of small-size, wideband mobile communication devices.

Figure 4A:
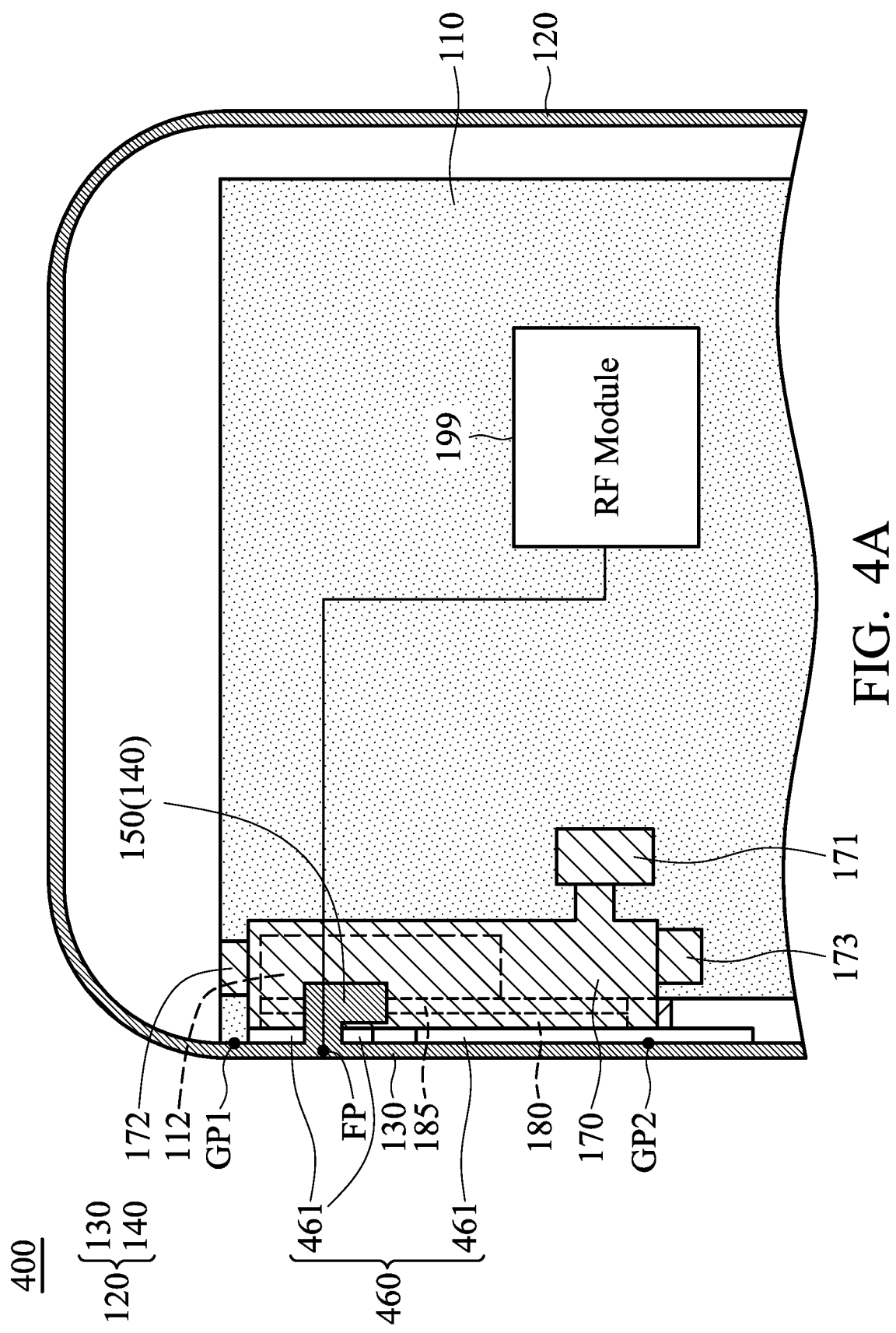
FIG. 4A is a back view of a mobile device according to an embodiment of the invention.
Figure 4B:
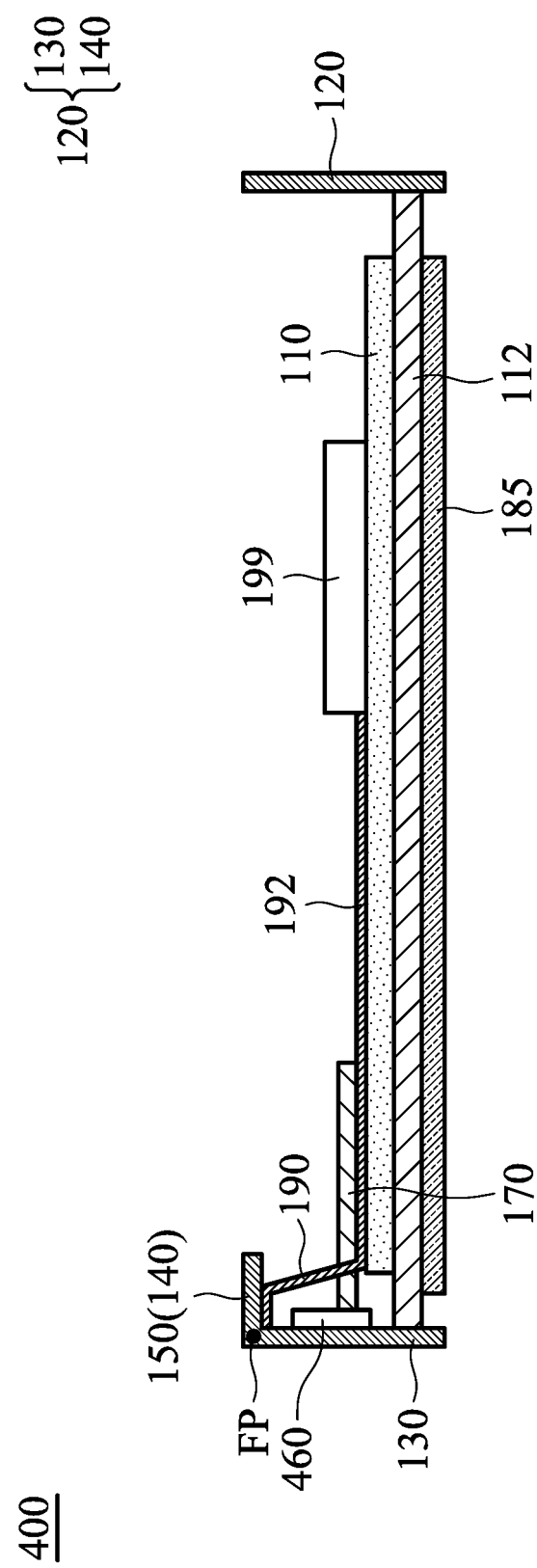
FIG. 4B is a side view of a mobile device according to an embodiment of the invention.

FIG. 4A is a back view of a mobile device 400 according to an embodiment of the invention. FIG. 4B is a side view of the mobile device 400 according to an embodiment of the invention. FIG. 4A and FIG. 4B are similar to FIG. 1A and FIG. 1B. The difference between the two embodiments is that an electronic component 460 of the mobile device 400 includes one or more sensing elements 461. The sensing elements 461 and the FPC 170 are disposed at the internal side of the first portion 130 of the metal frame 120. The sensing elements 461 and the FPC 170 are coupled to each other. At this time, there is no opening designed on at least the first portion 130 of the metal frame 120 due to the arrangements of the sensing elements 461. Each of the sensing elements 461 may be a pressure sensor for detecting the pressing state of the first portion 130 of the metal frame 120, which is pressed by a user. Similarly, the aforementioned antenna structure can be integrated with the electronic component 460 and the FPC 170, and used together with the narrow and small clearance region 180, so as to minimize the whole antenna size. Other features of the mobile device 400 of FIG. 4A and FIG. 4B are similar to those of the mobile device 100 of FIG. 1A, FIG. 1B, and FIG. 2. Accordingly, the two embodiments can achieve similar levels of performance.

The following embodiments will introduce a variety of different configurations of the invention. It should be understood that these figures and descriptions are merely exemplary, rather than limitations of the invention.

Figure 5:
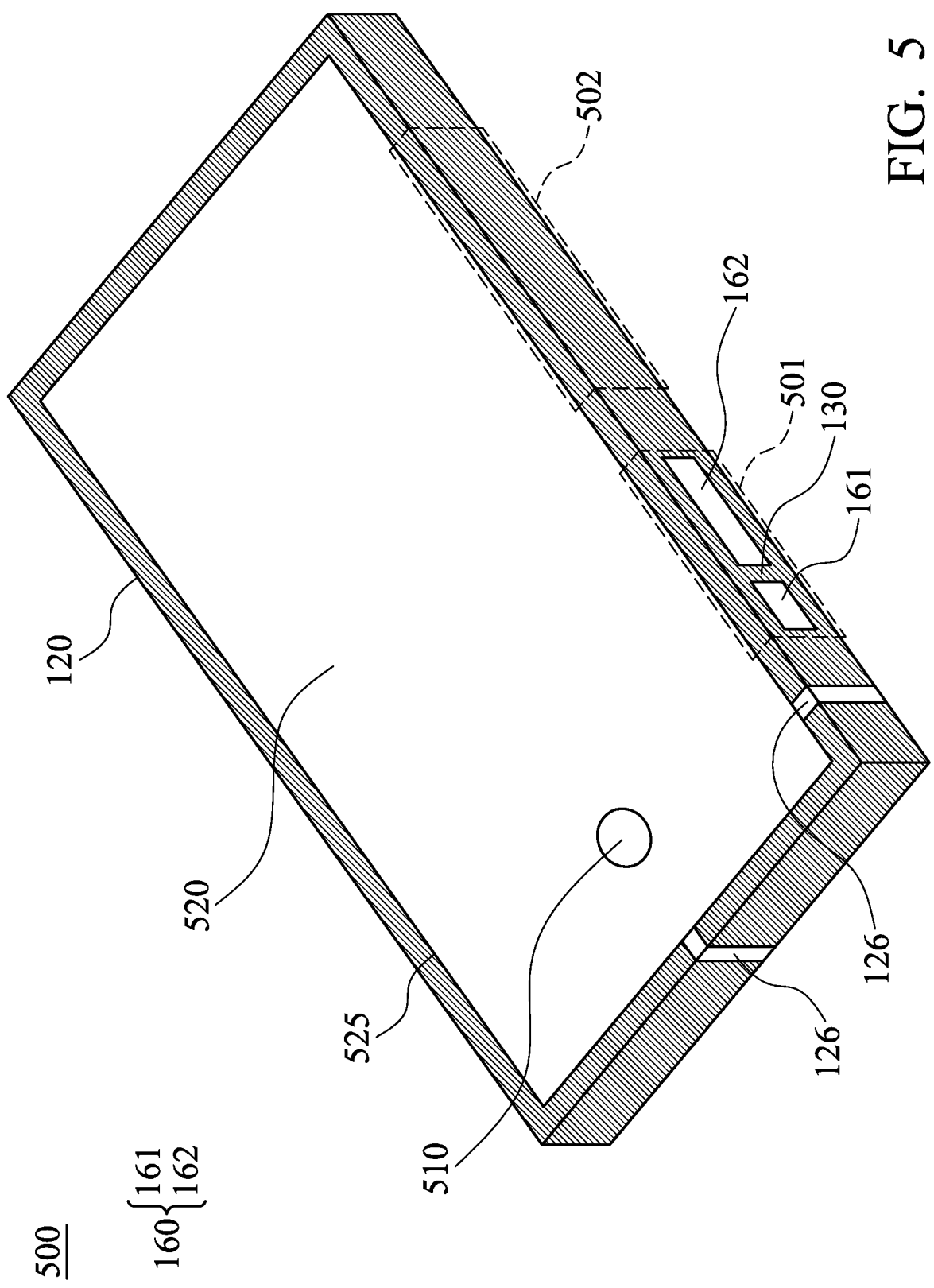
FIG. 5 is a perspective view of a mobile device according to an embodiment of the invention.

FIG. 5 is a perspective view of a mobile device 500 according to an embodiment of the invention. In the embodiment of FIG. 5, the mobile device 500 further includes a main camera 510 and a non-metal back cover 520. The main camera 510 is embedded in the non-metal back cover 520. As mentioned above, the antenna structure can be formed by the first portion 130 of the metal frame 120 (the antenna structure may be formed at a first position 501 or a second position 502), and the antenna structure can be integrated with the electronic components 160 (e.g., the aforementioned side buttons 161 and 162 or the aforementioned sensing elements 461) and the FPC. A boundary 525 between the non-metal back cover 520 and the metal frame 120 is positioned at a back side of the mobile device 500. In other embodiments, the non-metal back cover 520 extends from the back side to a lateral side of the mobile device 500, such that the boundary 525 between the non-metal back cover 520 and the metal frame 120 is positioned at the lateral side of the mobile device 500. The other portions of the metal frame 120 (except for the first portion 130 and the second portion 140) may have one or more cut points 126 for fine-tuning the impedance matching and the resonant frequency of the other antenna elements.

Figure 6:
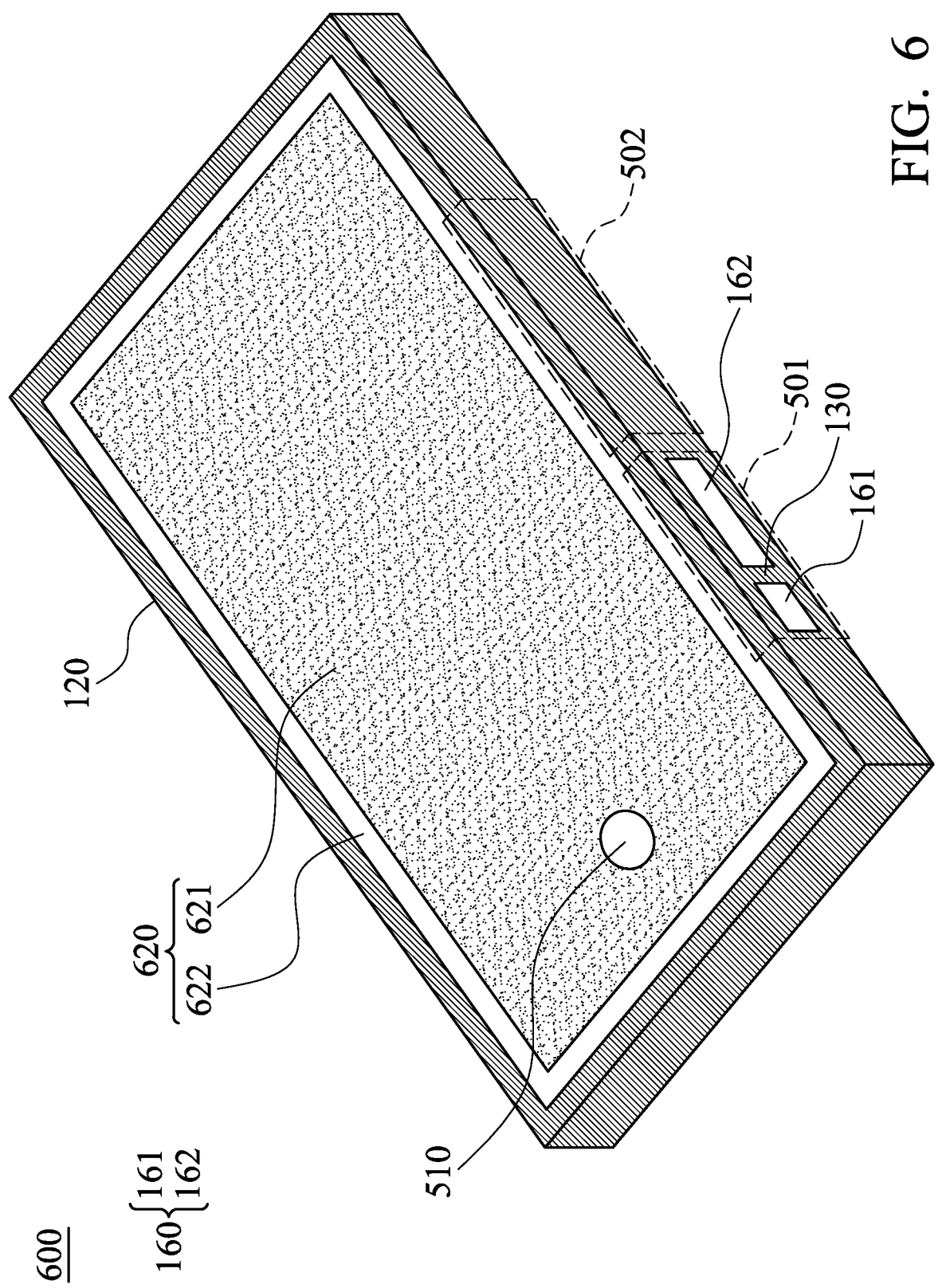
FIG. 6 is a perspective view of a mobile device according to an embodiment of the invention.

FIG. 6 is a perspective view of a mobile device 600 according to an embodiment of the invention. In the embodiment of FIG. 6, the mobile device 600 further includes a back cover 620. As mentioned above, the antenna structure can be formed by the first portion 130 of the metal frame 120 (the antenna structure may be formed at a first position 501 or a second position 502), and the antenna structure can be integrated with the electronic components 160 (e.g., the aforementioned side buttons 161 and 162 or the aforementioned sensing elements 461) and the FPC. The back cover 620 includes a metal portion 621 and a non-metal portion 622. The metal portion 621 substantially has a rectangular shape, and the non-metal portion 622 substantially has a loop shape, such that the metal portion 621 is completely surrounded by the non-metal portion 622. The non-metal portion 622 of the back cover 620 can prevent the metal portion 621 from directly touching the first portion 130 of the metal frame 120. Accordingly, good communication quality of the antenna structure can be maintained.

Figure 7:
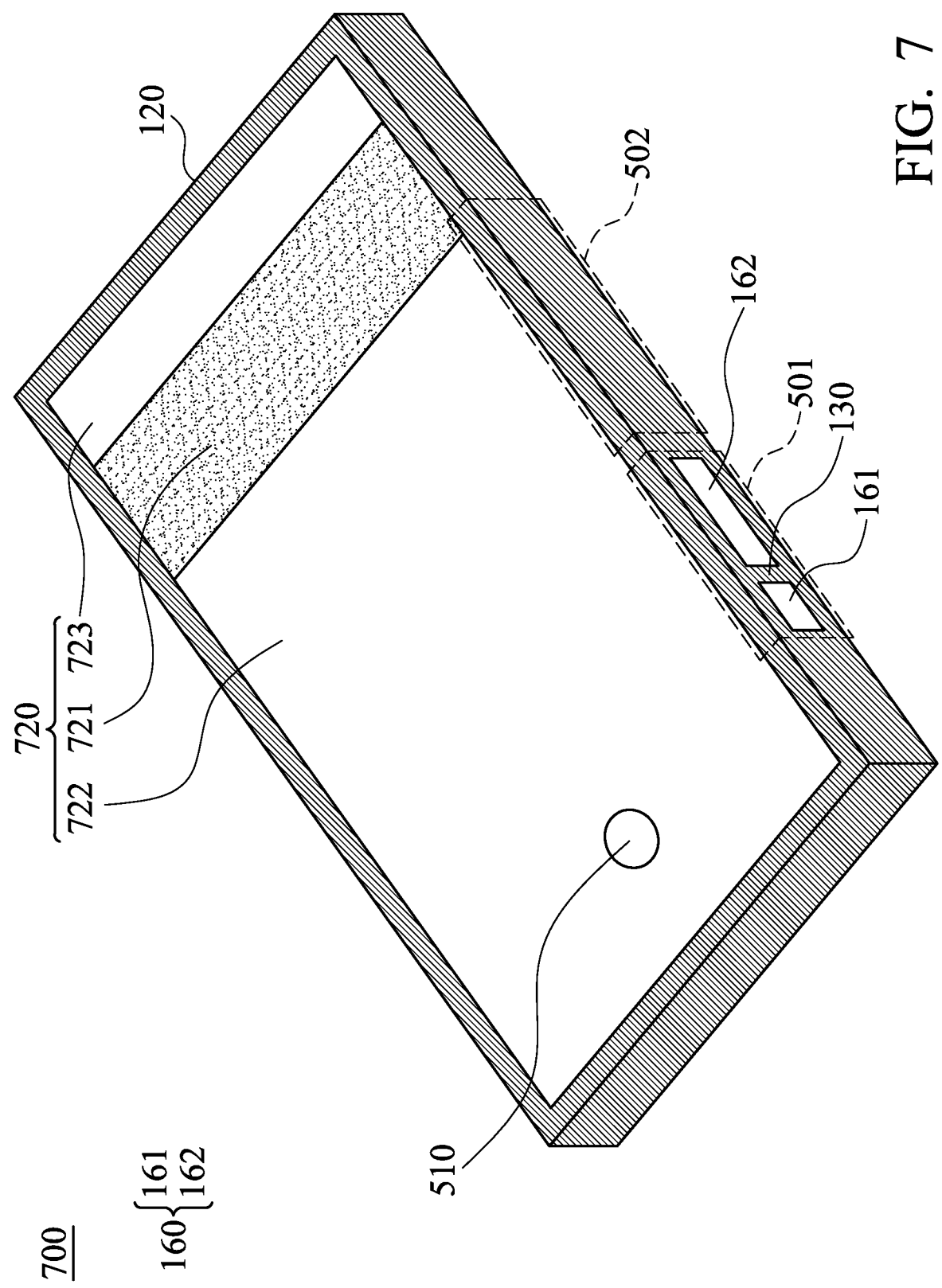
FIG. 7 is a perspective view of a mobile device according to an embodiment of the invention.

FIG. 7 is a perspective view of a mobile device 700 according to an embodiment of the invention. In the embodiment of FIG. 7, the mobile device 700 further includes a back cover 720. As mentioned above, the antenna structure can be formed by the first portion 130 of the metal frame 120 (the antenna structure may be formed at a first position 501 or a second position 502), and the antenna structure can be integrated with the electronic components 160 (e.g., the aforementioned side buttons 161 and 162 or the aforementioned sensing elements 461) and the FPC. The back cover 720 includes a metal portion 721, a first non-metal portion 722, and a second non-metal portion 723. The metal portion 721 is positioned between the first non-metal portion 722 and the second non-metal portion 723, and is configured to completely separate the first non-metal portion 722 from the second non-metal portion 723. The first non-metal portion 722 of the back cover 720 can prevent the metal portion 721 from directly touching the first portion 130 of the metal frame 120. Accordingly, good communication quality of the antenna structure can be maintained. In some embodiments, the mobile device 700 uses a spray and coat process to reduce the visual difference between the metal portion 721 and each of the first non-metal portion 722 and the second non-metal portion 723, thereby improving the appearance consistency of the mobile device 700.

Figure 8:
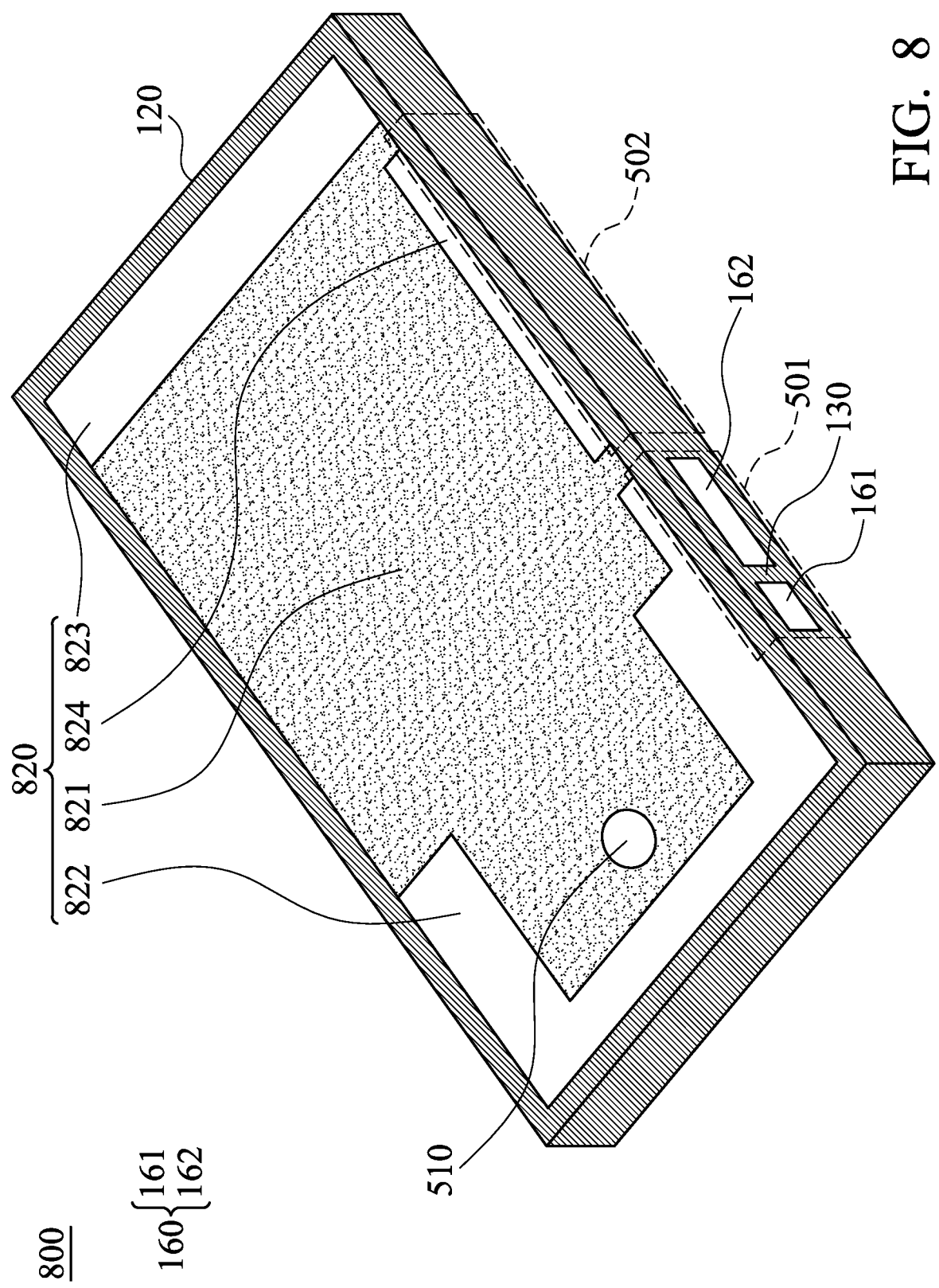
FIG. 8 is a perspective view of a mobile device according to an embodiment of the invention.

FIG. 8 is a perspective view of a mobile device 800 according to an embodiment of the invention. In the embodiment of FIG. 8, the mobile device 800 further includes a back cover 820. As mentioned above, the antenna structure can be formed by the first portion 130 of the metal frame 120 (the antenna structure may be formed at a first position 501 or a second position 502), and the antenna structure can be integrated with the electronic components 160 (e.g., the aforementioned side buttons 161 and 162 or the aforementioned sensing elements 461) and the FPC. The back cover 820 includes a metal portion 821, a first non-metal portion 822, a second non-metal portion 823, and a third non-metal portion 824. The metal portion 821 is positioned between the first non-metal portion 822, the second non-metal portion 823, and the third non-metal portion 824. Specifically, the metal portion 821 can make the first non-metal portion 822, the second non-metal portion 823, and the third non-metal portion 824 completely separate from each other. In comparison to the embodiment of FIG. 7, the first non-metal portion 822, the second non-metal portion 823, and the third non-metal portion 824 of the back cover 820 have different shapes. For example, the first non-metal portion 822 may substantially have a U-shape, the second non-metal portion 823 may substantially have a rectangular shape, and the third non-metal portion 824 may substantially have a thin and long straight-line shape. The first non-metal portion 822 of the back cover 820 can prevent the metal portion 821 from directly touching the first portion 130 of the metal frame 120. Accordingly, good communication quality of the antenna structure can be maintained. In some embodiments, the mobile device 800 uses a spray and coat process to reduce the visual difference between the metal portion 821 and each of the first non-metal portion 822, the second non-metal portion 823, and the third non-metal portion 824, thereby improving the appearance consistency of the mobile device 800. It should be noted that aforementioned back cover and metal frame may be the same mechanism element (both are integrally formed), or may be two independent elements which are manufactured independently.

Figure 9:
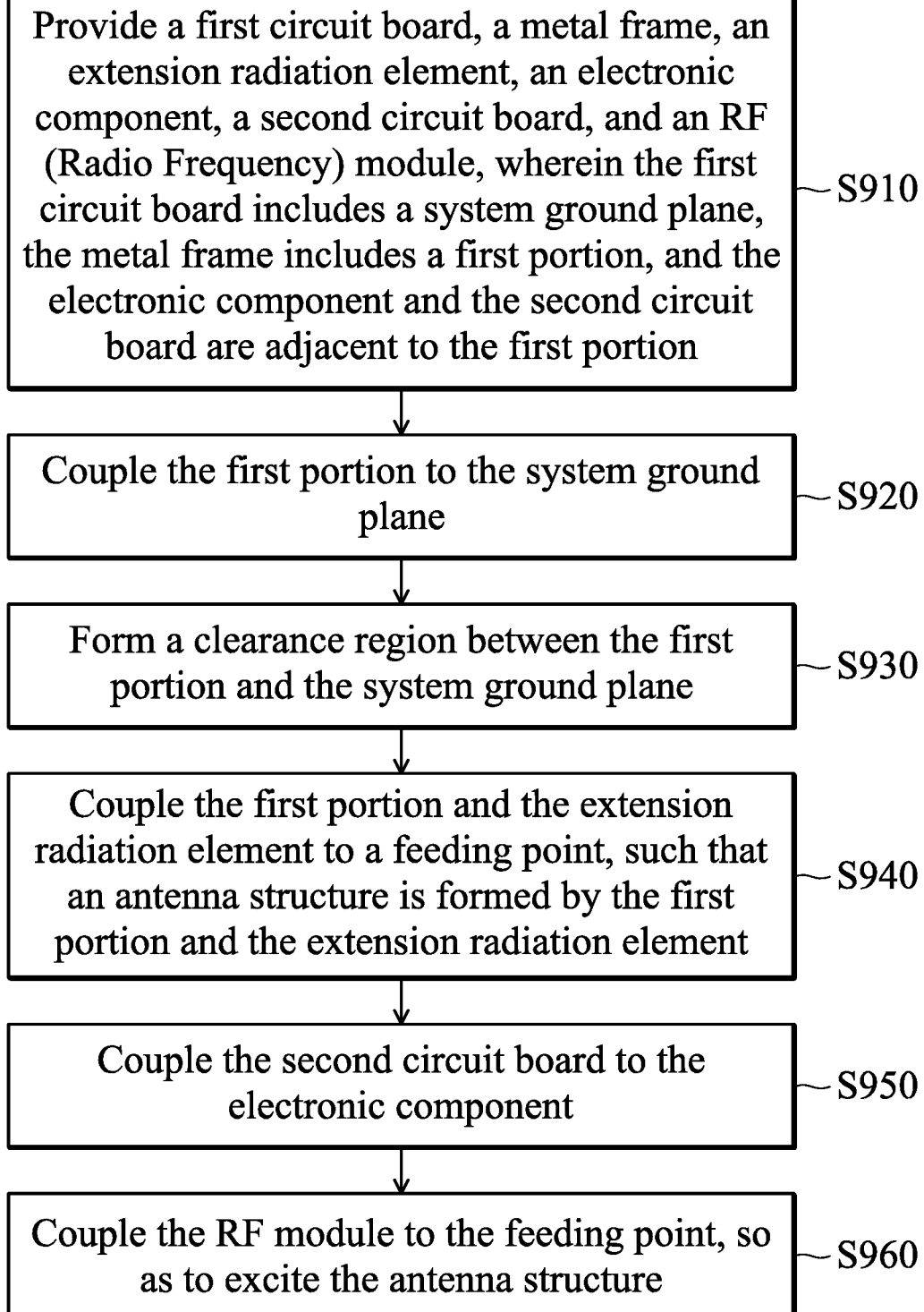
FIG. 9 is a flowchart of a method for manufacturing a mobile device according to an embodiment of the invention.

FIG. 9 is a flowchart of a method for manufacturing a mobile device according to an embodiment of the invention. The manufacturing method includes at least the following steps. In step S910, a first circuit board, a metal frame, an extension radiation element, an electronic component, a second circuit board, and an RF (Radio Frequency) module are provided. The first circuit board includes a system ground plane. The metal frame includes a first portion. The electronic component and the second circuit board are adjacent to the first portion. In step S920, the first portion is coupled to the system ground plane. In step S930, a clearance region is formed between the first portion and the system ground plane. In step S940, the first portion and the extension radiation element are coupled to a feeding point, such that an antenna structure is formed by the first portion and the extension radiation element. In step S950, the second circuit board is coupled to the electronic component. In step S960, the RF module is coupled to the feeding point, so as to excite the antenna structure. It should be understood that the above steps are not required to be performed in order, and any one or more device features of FIGS. 1 to 8 may be applied to the manufacturing method of the mobile device of FIG. 9.

Note that the above element sizes, element shapes, and frequency ranges are not limitations of the invention. An antenna designer can fine-tune these settings or values according to different requirements. It should be understood that the mobile device and the manufacturing method of the invention are not limited to the configurations of FIGS. 1-9. The invention may include any one or more features of any one or more embodiments of FIGS. 1-9. In other words, not all of the features displayed in the figures should be implemented in the mobile device and the manufacturing method of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A mobile device, comprising:
a first circuit board, comprising a system ground plane;
a metal frame, at least comprising a first portion, wherein the first portion is electrically coupled to the system ground plane and a feeding point, and wherein an antenna structure is formed by the first portion and the feeding point;
an electronic component;
a second circuit board, electrically coupled to the electronic component, wherein the electronic component and the second circuit board are adjacent to the first portion; and an RF (Radio Frequency) module, electrically coupled to the feeding point, so as to excite the antenna structure, wherein the first portion is excited to generate a low-frequency band, and wherein a length of the first portion is equal to 0.5 wavelength of the low-frequency band.

2. The mobile device as claimed in claim 1, wherein the first portion has a first end and a second end, a first end of the first portion is coupled to a first shorting point on the system ground plane, and a second end of the first portion is coupled to a second shorting point on the system ground plane.

3. The mobile device as claimed in claim 2, wherein a clearance region is formed between the first portion and the system ground plane.

4. The mobile device as claimed in claim 3, wherein the clearance region is positioned between the first shorting point and the second shorting point.

5. The mobile device as claimed in claim 3, wherein the metal frame further comprises an extension element which is electrically coupled to the feeding point.

6. The mobile device as claimed in claim 5, wherein the metal frame further comprises a second portion, and the extension element is formed by the second portion.

7. The mobile device as claimed in claim 5, wherein the extension element is printed on a flexible printed circuit board.

8. The mobile device as claimed in claim 5, wherein the extension element has a vertical projection which at least partially overlaps the second circuit board.

9. The mobile device as claimed in claim 5, wherein the extension element has a vertical projection which at least partially overlaps the clearance region.

10. The mobile device as claimed in claim 5, wherein the extension element is excited to generate the high-frequency band.

11. The mobile device as claimed in claim 1, wherein the first circuit board is a system circuit board, and the second circuit board is a flexible printed circuit board.

12. The mobile device as claimed in claim 1, further comprising:
a feeding connection element; and
an RF signal line, wherein the feeding point is coupled through the feeding connection element and the RF signal line to the RF module.

13. The mobile device as claimed in claim 12, wherein the feeding connection element is coupled to an extension element.

14. The mobile device as claimed in claim 1, wherein the second circuit board is further electrically coupled to the system ground plane.

15. The mobile device as claimed in claim 1, wherein the second circuit board is disposed on the first circuit board.

16. The mobile device as claimed in claim 1, wherein the electronic component comprises a power button and/or a volume button.

17. The mobile device as claimed in claim 16, wherein the power button and the volume button are at least partially disposed at an external side of the first portion of the metal frame.

18. The mobile device as claimed in claim 16, wherein the power button and the volume button at least partially extend to an internal side of the first portion of the metal frame.

19. The mobile device as claimed in claim 16, wherein there is no cut point formed on the first portion of the metal frame, and the opening is not equivalent to a cut point.

20. The mobile device as claimed in claim 1, wherein the electronic component comprises one or more sensing elements.

21. The mobile device as claimed in claim 20, wherein the sensing elements are disposed at an internal side of the first portion.

22. The mobile device as claimed in claim 1, further comprising:
a main camera; and
a non-metal back cover, wherein the main camera is embedded in the non-metal back cover.

23. The mobile device as claimed in claim 22, wherein a boundary between the non-metal back cover and the metal frame is positioned at a back side or a lateral side of the mobile device.

24. The mobile device as claimed in claim 22, wherein the metal frame further has one or more cut points.

25. The mobile device as claimed in claim 1, wherein the electronic component comprises at least a physical button disposed in an opening of the first portion of the metal frame.

* * * * *